United States Patent
Gupta et al.

(10) Patent No.: US 10,642,507 B2
(45) Date of Patent: May 5, 2020

(54) PULSED LEADER CONSENSUS MANAGEMENT

(71) Applicant: Nutanix, Inc., San Jose, CA (US)

(72) Inventors: Karan Gupta, San Jose, CA (US); Rishi Bhardwaj, San Jose, CA (US); Chinmay Dinesh Kamat, San Jose, CA (US); Pavan Kumar Konka, Milpitas, CA (US)

(73) Assignee: Nutanix, Inc., San Jose, CA (US)

( * ) Notice: Subject to any disclaimer, the term of this patent is extended or adjusted under 35 U.S.C. 154(b) by 1279 days.

(21) Appl. No.: 14/610,285

(22) Filed: Jan. 30, 2015

(65) Prior Publication Data

US 2020/0034048 A1  Jan. 30, 2020

(51) Int. Cl.
*G06F 3/06* (2006.01)
*G06F 16/11* (2019.01)

(52) U.S. Cl.
CPC ............ *G06F 3/0619* (2013.01); *G06F 3/065* (2013.01); *G06F 3/067* (2013.01); *G06F 16/11* (2019.01)

(58) Field of Classification Search
CPC ........ G06F 3/067; G06F 3/0619; G06F 3/065; G06F 16/11
USPC .................................................. 707/623, 634
See application file for complete search history.

(56) References Cited

U.S. PATENT DOCUMENTS

| | | |
|---|---|---|
| 5,253,252 A | 10/1993 | Tobol |
| 5,884,308 A | 3/1999 | Foulston |
| 6,363,416 B1 | 3/2002 | Naeimi et al. |
| 6,684,397 B1 | 1/2004 | Byer et al. |
| 6,738,801 B1 | 5/2004 | Kawaguchi et al. |
| 6,928,589 B1 | 8/2005 | Pomaranski et al. |
| 7,379,419 B2 | 5/2008 | Collins |
| 7,421,578 B1 * | 9/2008 | Huang .................. H04L 63/065 370/254 |
| 7,461,374 B1 | 12/2008 | Balint et al. |
| 7,647,427 B1 | 1/2010 | Devarapalli |
| 7,720,864 B1 | 5/2010 | Muth et al. |

(Continued)

FOREIGN PATENT DOCUMENTS

| | | |
|---|---|---|
| EP | 1 229 443 A2 | 8/2002 |
| WO | WO 2011078646 A1 | 6/2011 |
| WO | WO 2014200564 A1 | 12/2014 |

OTHER PUBLICATIONS

Notice of Allowance and Fee(s) due dated Apr. 5, 2017 for related U.S. Appl. No. 14/584,466.

(Continued)

*Primary Examiner* — Phong H Nguyen
(74) *Attorney, Agent, or Firm* — Vista IP Law Group, LLP

(57) ABSTRACT

A system using pulsed leader consensus management that can manage storage by electing a leader node from a group of nodes and fulfilling read requests for the group of nodes if a sync state is not expired. The sync state can correspond to two conditions: first, that the nodes in the group direct the write requests for the group to the leader node; second, that a health pulse is detected, wherein the health pulse is generated if the leader node is alive (e.g. has not failed, terminated, or become non-responsive). If either of the two conditions fail, the sync state can be considered expired and the group of nodes may fall back to consensus-based read mechanisms, such as Paxos, until a new leader node is elected.

20 Claims, 11 Drawing Sheets

(56) References Cited

U.S. PATENT DOCUMENTS

| | | | |
|---|---|---|---|
| 7,934,117 B2 | 4/2011 | Kakivaya et al. | |
| 7,937,455 B2 | 5/2011 | Saha et al. | |
| 7,941,470 B2* | 5/2011 | Le | G06F 3/0607 |
| | | | 708/208 |
| 7,990,962 B2 | 8/2011 | Chang et al. | |
| 8,051,252 B2 | 11/2011 | Williams | |
| 8,051,262 B2 | 11/2011 | Ichikawa et al. | |
| 8,219,769 B1 | 7/2012 | Wilk | |
| 8,392,680 B1 | 3/2013 | Natanzon et al. | |
| 8,424,003 B2 | 4/2013 | Degenaro et al. | |
| 8,473,775 B1* | 6/2013 | Helmick | G06F 11/00 |
| | | | 714/4.11 |
| 8,549,518 B1* | 10/2013 | Aron | G06F 9/45558 |
| | | | 718/1 |
| 8,601,471 B2 | 12/2013 | Beaty | |
| 8,601,473 B1 | 12/2013 | Aron et al. | |
| 8,850,130 B1 | 9/2014 | Aron et al. | |
| 8,898,668 B1 | 11/2014 | Costea | |
| 9,009,106 B1 | 4/2015 | Aron et al. | |
| 9,032,248 B1 | 5/2015 | Petty | |
| 9,286,344 B1 | 3/2016 | Bhardwaj et al. | |
| 9,389,887 B1 | 7/2016 | Aron et al. | |
| 9,639,588 B2* | 5/2017 | Cheng | G06F 3/061 |
| 9,772,866 B1 | 9/2017 | Aron et al. | |
| 9,898,522 B2* | 2/2018 | Cole | G06F 16/283 |
| 2002/0133491 A1 | 9/2002 | Sim et al. | |
| 2005/0210461 A1 | 9/2005 | Srivastava et al. | |
| 2005/0268298 A1 | 12/2005 | Hunt et al. | |
| 2006/0069912 A1 | 3/2006 | Zheng et al. | |
| 2007/0271561 A1 | 11/2007 | Winner et al. | |
| 2008/0189468 A1 | 8/2008 | Schmidt et al. | |
| 2009/0113034 A1 | 4/2009 | Krishnappa et al. | |
| 2009/0144720 A1 | 6/2009 | Roush et al. | |
| 2009/0290572 A1 | 11/2009 | Gonia et al. | |
| 2010/0042869 A1 | 2/2010 | Szabo et al. | |
| 2010/0110150 A1 | 5/2010 | Xu et al. | |
| 2010/0162226 A1 | 6/2010 | Borissov et al. | |
| 2010/0262717 A1 | 10/2010 | Critchley | |
| 2011/0107135 A1 | 5/2011 | Andrews et al. | |
| 2011/0173493 A1 | 7/2011 | Armstrong et al. | |
| 2011/0184993 A1 | 7/2011 | Chawla | |
| 2012/0078948 A1 | 3/2012 | Darcy | |
| 2012/0117555 A1 | 5/2012 | Banerjee et al. | |
| 2012/0222089 A1 | 8/2012 | Whelan et al. | |
| 2012/0233608 A1 | 9/2012 | Toeroe | |
| 2012/0243795 A1 | 9/2012 | Head et al. | |
| 2012/0254342 A1* | 10/2012 | Evans | G06F 11/186 |
| | | | 709/214 |
| 2012/0266231 A1 | 10/2012 | Spiers et al. | |
| 2012/0317142 A1 | 12/2012 | Broecheler et al. | |
| 2013/0007741 A1 | 1/2013 | Britsch et al. | |
| 2013/0036323 A1 | 2/2013 | Goose et al. | |
| 2013/0054973 A1 | 2/2013 | Fok et al. | |
| 2013/0138995 A1 | 5/2013 | Sivaramakrishnan et al. | |
| 2013/0152077 A1 | 6/2013 | Leitman et al. | |
| 2013/0174246 A1 | 7/2013 | Schrecker et al. | |
| 2013/0219030 A1 | 8/2013 | Szabo | |
| 2013/0227550 A1 | 8/2013 | Weinstein et al. | |
| 2013/0235774 A1 | 9/2013 | Jo et al. | |
| 2013/0304694 A1 | 11/2013 | Barreto et al. | |
| 2013/0332771 A1 | 12/2013 | Salapura et al. | |
| 2014/0052877 A1 | 2/2014 | Mao | |
| 2014/0068612 A1 | 3/2014 | Torrey | |
| 2014/0068711 A1 | 3/2014 | Schweitzer, III et al. | |
| 2014/0089259 A1* | 3/2014 | Cheng | G06F 3/061 |
| | | | 707/612 |
| 2014/0101649 A1 | 4/2014 | Kamble | |
| 2014/0109172 A1 | 4/2014 | Barton et al. | |
| 2014/0143831 A1 | 5/2014 | Fieweger | |
| 2014/0222953 A1 | 8/2014 | Karve et al. | |
| 2015/0039763 A1* | 2/2015 | Chaudhary | H04L 47/125 |
| | | | 709/226 |
| 2015/0106325 A1* | 4/2015 | Cole | G06F 16/283 |
| | | | 707/600 |
| 2015/0205618 A1 | 7/2015 | Bailey et al. | |
| 2015/0244802 A1 | 8/2015 | Simoncelli | |
| 2015/0326531 A1 | 11/2015 | Cui et al. | |
| 2015/0347775 A1 | 12/2015 | Bie et al. | |
| 2016/0034555 A1 | 2/2016 | Rahut et al. | |
| 2016/0057009 A1 | 2/2016 | Kadayam et al. | |
| 2016/0077936 A1 | 3/2016 | Tang et al. | |
| 2016/0203008 A1 | 7/2016 | Cui et al. | |
| 2016/0204977 A1 | 7/2016 | Cui et al. | |
| 2016/0359955 A1 | 12/2016 | Gill et al. | |
| 2017/0094002 A1 | 3/2017 | Kumar et al. | |
| 2017/0214738 A1 | 7/2017 | Agarwal et al. | |

OTHER PUBLICATIONS

Ajmani et al., "Scheduling and Simulation: How to Upgrade Distributed Systems," HotOS IX: The 9th Workshop on Hot Topics in Operating Systems, USENIX, 2003, pp. 43-48.

Kochut, Andrzej and Alexei Karve, "Leveraging Local Image Redundancy for Efficient Virtual Machine Provisioning," 2012 IEEE Network Operations and Management Symposium, Jun. 8, 2012, pp. 179-187.

Soules et al.; "Metadata Efficiency in a Comprehensive Versioning File System", May 2002, CMU-CS-02-145, School of Computer Science, Carnegie Mellon University, Pittsburgh, PA 15213, 33 pages.

Notice of Allowance and Fee(s) due dated Apr. 10, 2017 for related U.S. Appl. No. 14/278,363.

Non-final Office Action dated Sep. 22, 2016 for related U.S. Appl. No. 14/584,466.

Citrix, "Citrix XenServer 6.0 Administrator's Guide", Copyright 2012 Citrix Systems, Inc., 207 pages.

John L Hufferd, Hufferd Enterprises, SNIA "IP Storage Protocols: iSCSI", Copyright 2011 Storage Networking Industry Association, 46 pages.

VMware, Technical White Paper, "Multipathing Configuration for Software iSCSI Using Port Binding", Copyright 2012 Vmware, Inc., 15 pages.

Non-final Office Action dated Oct. 7, 2016 for related U.S. Appl. No. 14/278,363.

Notice of Allowance and Fee(s) due dated Oct. 24, 2016 for related U.S. Appl. No. 14/206,869.

Non-final Office Action dated Nov. 1, 2016 for related U.S. Appl. No. 14/708,091.

Final Office Action dated Apr. 20, 2017 for related U.S. Appl. No. 14/708,091.

Notice of Allowance and Fee(s) due dated May 15, 2017 for related U.S. Appl. No. 15/069,961.

Non-Final Office Action dated Jan. 26, 2017 for related U.S. Appl. No. 15/069,961.

Non-final Office Action dated Jul. 7, 2015 for related U.S. Appl. No. 14/278,363.

Non-final Office Action dated Jul. 16, 2015 for related U.S. Appl. No. 14/584,466.

International Search Report and Written Opinion dated Aug. 20, 2015, for related PCT Patent Application No. PCT/US15/31096, 8 pages.

International Search Report and Written Opinion dated Aug. 26, 2015, for related PCT Patent Application No. PCT/US15/31096, 8 pages.

Final Office Action dated Feb. 25, 2016 for related U.S. Appl. No. 14/584,466.

Final Office Action dated Mar. 23, 2016 for related U.S. Appl. No. 14/278,363.

Notice of Allowance and Fee(s) due dated Jul. 19, 2016 for related U.S. Appl. No. 14/206,869.

Lamport, Leslie "Paxos Made Simple," dated Nov. 1, 2001, 14 pages.

Alexander Shraer, et al., "Dynamic Reconfiguration of Primary/Backup Clusters," dated 2011, 13 pages.

Notice of Allowance and Fee(s) due dated Oct. 30, 2015 for related U.S. Appl. No. 14/144,520.

Wikipedia, "Compare-and-swap," Nov. 9, 2015, 6 pages.

(56) References Cited

OTHER PUBLICATIONS

International Search Report and Written Opinion dated Aug. 7, 2015, for corresponding PCT Patent Application No. PCT/US2015/030026, 10 pages.
Non-final Office Action dated Jul. 17, 2015 for related U.S. Appl. No. 14/206,869.
PCT International Search Report and Written Opinion dated Jun. 15, 2015 for related PCT Patent Application No. PCT/US2015/020139.
Final Office Action dated Jan. 25, 2016 for related U.S. Appl. No. 14/206,869.
European Search Report dated May 19, 2017 for related EP Application No. 15788922.1, 11 pages.
Non-Final Office Action dated Aug. 24, 2017 for related U.S. Appl. No. 14/708,091.
European Search Report dated May 5, 2017 for related EP Application No. 15792334.3, 13 pages.
European Extended Search Report dated Jan. 15, 2018 for related EP Application No. 15762234.1, 19 pages.
Final Office Action dated Feb. 27, 2018 for related U.S. Appl. No. 14/708,091.
Advisory Action dated May 18, 2018 for related U.S. Appl. No. 14/708,091.
Non-Final Office Action dated Jun. 7, 2018 for related U.S. Appl. No. 15/294,422.
Non-Final Office Action dated Jun. 29, 2018 for related U.S. Appl. No. 15/160,347.
Notice of Allowance dated Sep. 6, 2018 for related U.S. Appl. No. 14/708,091, 8 pages.
First Office Action dated Jul. 30, 2018 for related European Application No. 15762234.1, 6 pages.
Non-Final Office Action dated Nov. 14, 2018 for related U.S. Appl. No. 15/678,893, 7 pages.
Notice of Allowance dated Nov. 20, 2018 for related U.S. Appl. No. 15/294,422, 7 pages.
Intention to Grant dated Jan. 3, 2019 for related EP Application No. 15792334.3, 7 pages.
Final Office Action dated Jan. 28, 2019 for related U.S. Appl. No. 15/160,347, 16 pages.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Notice of Allowance dated Mar. 20, 2019 for related U.S. Appl. No. 15/678,893, 5 pages.
Notice of Allowance dated Mar. 26, 2019 for related U.S. Appl. No. 15/294,422, 7 pages.
Non-Final Office Action dated Sep. 6, 2019 for related U.S. Appl. No. 15/160,347.
Notice of Allowance dated Nov. 19, 2019 for related U.S. Appl. No. 14/708,091.

\* cited by examiner

PULSED LEADER CONSENSUS MANAGEMENT

BACKGROUND

In recent years, computing systems have grown to large-scale distributed systems that use thousands of servers to process millions of file requests in a continuous and seamless high-speed fashion. In addition to being faster than past computer systems, these new distributed systems are also more robust because data items are replicated and stored at multiple physical locations. If the servers at one of the locations fail, servers at other locations can act as backups and redistribute data.

However, there remains a need to ensure that data in a distributed system is replicated correctly. For example, if an individual's bank account balance is stored as a data item at three geographically separate data centers and the individual deposits $100,000 into his/her account, ensuring that all three data centers reflect the updated value is of paramount importance. If the data message to "increase the bank account balance by $100,000" is received at only one of the three data centers, and is lost in transmission to the other two data centers, a data conflict occurs and it may be unclear which data center contains the correct value for the bank account data.

Various consensus based algorithms and protocols have been implemented in an attempt to solve data conflict problems. Generally, consensus algorithms, such as Paxos, work by requiring nodes (e.g. servers) to vote or arbitrate amongst themselves to form a consensus as to what the correct value is for a given piece of data. For example, in a five-node (e.g. five server) system, if three out of five nodes reflect a deposit update of $100,000, the three out of five nodes constitute a majority, and the remaining two out of five nodes will agree to also reflect the $100,000 update whether or not a message to update the account by $100,000 was received.

Though consensus algorithms may ensure higher data accuracy, they are computationally expensive because every data value that needs to be processed must be arbitrated and/or voted on multiple times, which creates additional network traffic for every update. Thus, many distributed systems are forced to balance speed versus accuracy.

As is evident, there is a need for an approach in distributed systems for data accuracy that does not come at the cost of sacrificing speed.

SUMMARY

Embodiments of the present invention provide approaches for pulsed leader consensus management systems and methods. According to some embodiments, a leader node is elected from a group of nodes to perform leader-only reads. Each node in the group of nodes may be assigned an index number, and according to some embodiments, the node with the highest index number is elected to be the leader node. Once a node has been elected as a leader node, all non-leader nodes are informed of the leader node's identity and all non-leader nodes send some or all write requests to the leader node for processing.

In some embodiments, to become a leader and/or perform leader-only reads, the leader node may first scan the group of nodes to record their respective states and gather information on what data is currently being processed by the nodes. After the scan is complete, the leader node has a collection of all the data that is to be processed for the group of nodes. Further, once the scan is complete the leader node may initiate leader-reader mode and perform leader-only reads.

In some embodiments, the group of nodes only performs leader-only reads so long as the groups of nodes are in sync, as according to a sync state. In some embodiments, the group is in sync if (1) the leader node has not failed, as indicated by a leader node heartbeat or health pulse, and (2) all non-leader nodes direct all write requests to the leader node. If either condition fails, the group of nodes is not in sync. In the case where the group of nodes are not in sync, the group of nodes may fall back to consensus-based schemes, such as Paxos, to perform consensus based reads and/or writes.

The above example embodiments are explained merely as a high level overview of how pulsed leader consensus management systems and methods may be implemented. Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION

Figure 1A:
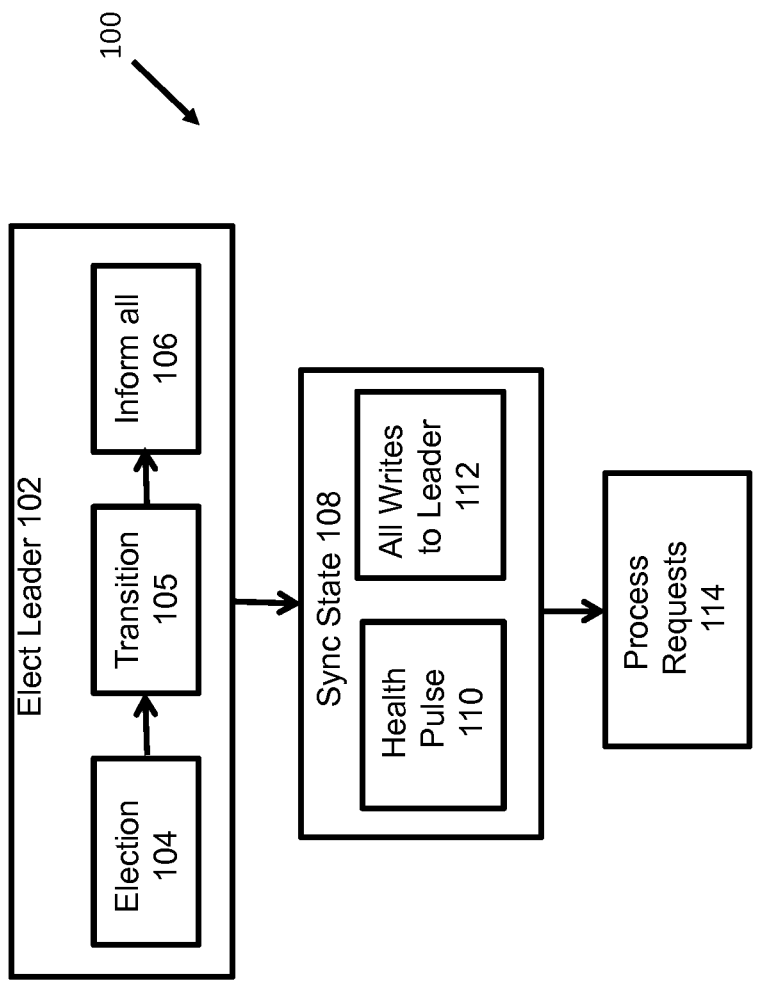
FIG. 1A-B show flowcharts of approaches for implementing pulsed leader consensus management according to some embodiments of the invention.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Before describing the examples illustratively depicted in the several figures, a general introduction is provided to further understanding.

As described below in additional detail, approaches for pulsed leader consensus management are implemented in some embodiments by electing a leader node from a group of two or more nodes, wherein after leader node election all node write requests are directed to the leader node and only the leader node may perform unilateral (e.g. leader-only) reads. In some embodiments, the leader node performs leader-only reads so long as a sync state is not expired. The sync state may correspond to two conditions: (1) all nodes directing all writes to the leader node, and (2) the leader node not failing, as indicated by a heartbeat or health pulse. If either of the conditions are false, or otherwise not met, the group of nodes is considered out of sync which may be indicated by an expired sync state.

FIG. 1 shows a flowchart for an approach 100 for implementing pulsed leader consensus management. At 102, a group of nodes elect a leader node through an election process 104. In one example of an election process, each node in the group may be assigned an index number and the node with the highest number is elected the group leader. At 105, a transition is performed according to some embodiments, wherein the elected leader node performs a scan of the groups of nodes to ascertain (e.g. make a copy) what data each node is processing. After the scan is complete, the leader node knows what data must be processed for the group. In some embodiments, the leader node scans the group of nodes, collects information, and generates a superset of data to be processed for the group, based at least in part on the scanned data. At 106, all nodes in the group are informed of the leader node's status and identity, at which point all nodes agree to route all writes for the group to the leader node.

At 108, a sync state is generated for the group of nodes. The sync state may require two conditions to be considered not expired (e.g. the group of nodes is "in-sync") with the leader node: (1) a first condition of a positive health pulse 110, and (2) a second condition that all writes for the group of nodes are routed to the leader node 112. In some embodiments, the health pulse 110 is a heartbeat for the leader node, wherein if the leader node fails or is terminated the heartbeat will not be generated. In some embodiments, the health pulse 110 may correspond to information such as whether any nodes have been added, removed, failed, or other information. The health pulse 110 may be generated periodically over a first time interval, such as one second. The two conditions for the sync state ensure that the leader node is aware of all the data being written to the data storage device (since all write requests for the group are routed to the leader node to write), and that the leader node is active and functional. In this way, at 114, the leader node may perform leader-only reads safely since the leader node knows all that has been written (e.g., all write requests gathered from the scan and/or routed to the leader to write) and, collectively, the group is certain that the leader is active and functioning, as according to some embodiments.

Figure 1B:
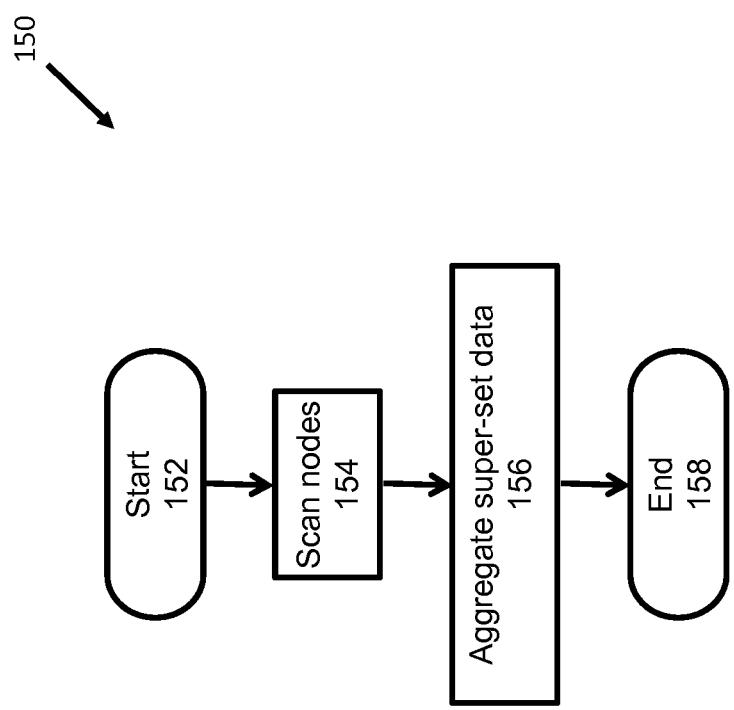

FIG. 1B shows a more detailed flowchart for the transition process 105, according to some embodiments. After 152, the leader node scans the group of nodes 154 from which it was elected leader to ascertain (e.g. make a copy) what data each node is processing. After the scan is complete, the leader node can aggregate the data collected from each node (e.g. data corresponding to the state of the node, what data it was processing, writing, or reading) into a superset of data that describes the processing/transition state of the group. After the superset data is generated or otherwise aggregated, the transition process ends at 158, according to some embodiments.

Figure 2:
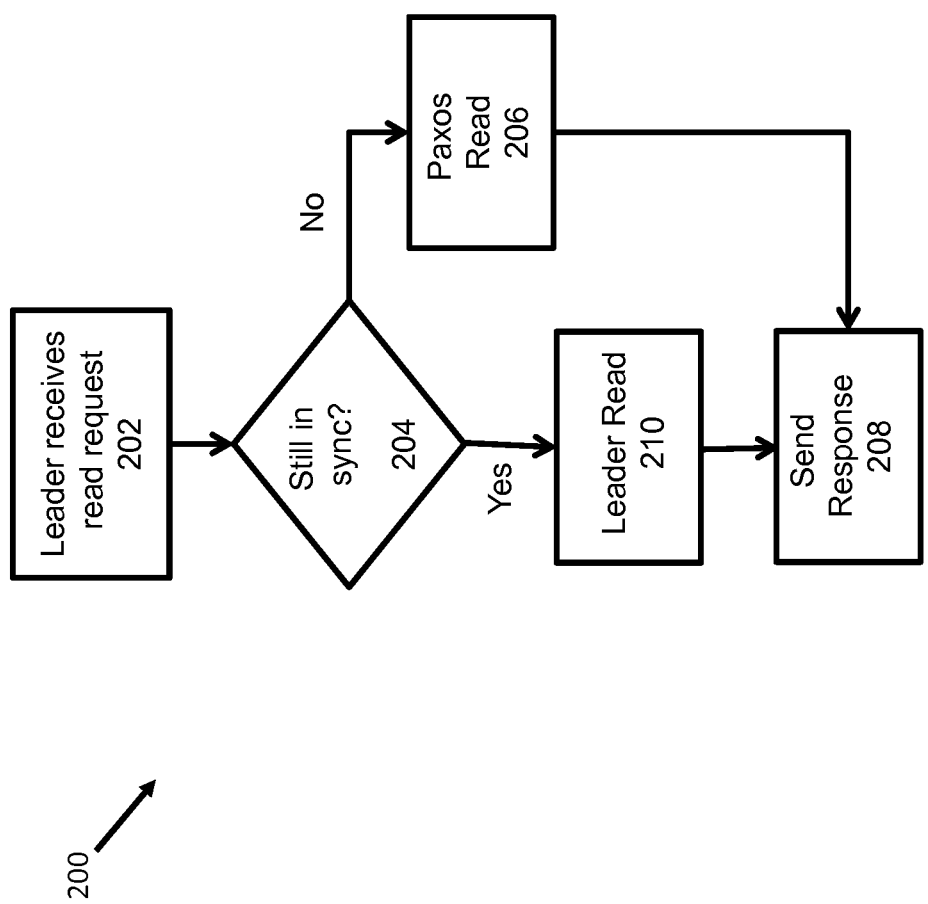
FIG. 2 shows a flowchart of an approach for determining sync status for pulsed leader consensus management according to some embodiments of the invention.

FIG. 2 shows a process 200 for how a pulsed leader consensus management system may arbitrate between leader-only reads and consensus reads, according to some embodiments. At 202, a leader node receives a read request from a client device. In some embodiments, the system checks whether it is in state (e.g. that the sync state has not expired) before allowing a leader-only read at 204. If the group of nodes is still in sync (e.g. the leader node is active and functional as indicated by a heartbeat), the leader node may perform leader-only reads at 210 and send the read results to the client device at 208. If the group of nodes is not in-sync (for instance, if the leader node has failed and is not producing a heartbeat), the group of nodes may then perform consensus based reads at 206, using consensus-based algorithms, such as Paxos-based schemes and/or algorithms. Once the group of nodes has performed a consensus read, the result may be transmitted to the client device at 208.

Figure 3:
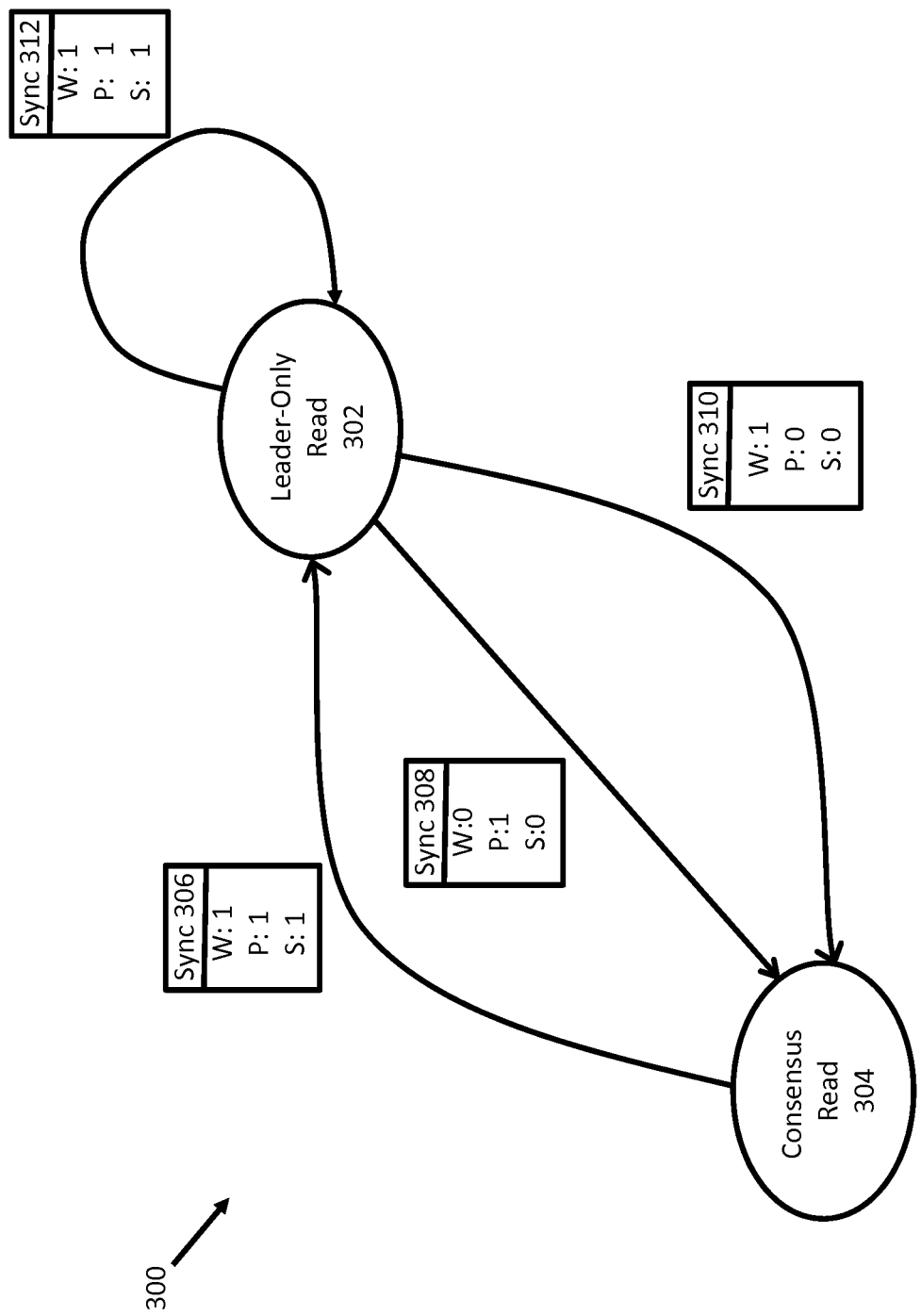
FIG. 3 shows a state machine diagram for sync states of a pulsed leader consensus management system according to some embodiments of the invention

FIG. 3 shows a state diagram 300 for implementing pulsed leader consensus management. The state diagram features two read states: a consensus read state 304 and a leader-only read state 302. A group of nodes may start in the consensus read state 304 and perform read requests for client devices using consensus-based algorithms, such as Paxos. However, once a leader node is elected and all nodes agree to send all write requests to the leader node, the group of nodes may transition to the leader-only read state 302, in which only the leader node performs reads.

Sync state data 306 illustrates the data required to transition between states, according to some embodiments. There, "W" is the condition that all nodes agree to route or send all write requests to the leader node. If this condition is fulfilled, then the write condition W is "met" and/or true (e.g. "W=1").

In some embodiments, "P" corresponds to the health pulse for the group of nodes. As explained above, according to some embodiments, the health pulse corresponds to a heartbeat that indicates whether the leader node is functioning. In those embodiments, if the leader node is active and/or functioning a heartbeat will be produced which corresponds to fulfilled health pulse condition (e.g. "P=1"). In some embodiments, "S" corresponds to whether the group is in sync or not. S is a logical AND operation between the W and P data values, and is true (e.g. "1") if W and P are both true (e.g. W=1 & P=1 → S=1). In this example, if S=1, the system may transition to the leader-only read state 306 and the leader node may perform leader-only reads without consulting the other nodes (as would be done, for instance, in consensus based approaches).

Once the group of nodes is in the leader-only state 302, for every read request generated for a client device, the system may check whether it is in state or not. If S=1, the system may perform leader-only reads. However, if S=0 the system falls back to reads based at least in part on consensus schemes (e.g. Paxos).

In some embodiments, as indicated by state transition 312 the group of nodes may stay in leader-only state 302 until one of the sync conditions (e.g. W or P) fail and expire the sync state. For example, at 310 all of the nodes are still routing all write requests to the leader (e.g. W=1), however a change in the node set has occurred (e.g. P=0, which may be indicative of a leader node failure). When one of the state conditions fail, as a safety precaution the system may fall back to the consensus read state 304; where reads are performed based at least in part on consensus-based schemes, at least until a new leader node can be elected and a new transition scan is conducted, as according to some embodiments.

Similarly, at 308 the health pulse condition is met (e.g. P=1) which means that the leader node is active and functioning; however the all-write condition has failed (e.g. W=0). That is, not all nodes are routing write requests to the leader node. Since all write requests are not being routed to the leader node, two versions of a data item may be potentially created: one version generated by the leader node, and one version generated by the "rogue" node that is not routing its write requests to the leader node. In this case, the safest course of action may be to again revert back to the consensus read state 304 to perform consensus operations, which may use majority votes and/or other arbitration rules to correct rogue node generated data.

In some embodiments, the health pulse may comprise a log entry that is created every second and contains data such as: node additions, node removals, node failures, and configuration information. As explained, the absence of the health pulse (e.g. leader heartbeat) may cause a P=0 condition. In some embodiments, a P=0 condition corresponds to the leader node failing or becoming unresponsive. In some embodiments, a P=0 condition corresponds to a non-leader node being added to the group, or a non-leader node changing its state, failing, and/or becoming non-responsive. In these cases, the safest course of action may be to revert the group of nodes to consensus based schemes, such as Paxos. In other words, while in some embodiments a heartbeat may be specific to a certain node, in some embodiments a heartbeat may correspond to the state condition of one or more nodes.

Figure 4A:
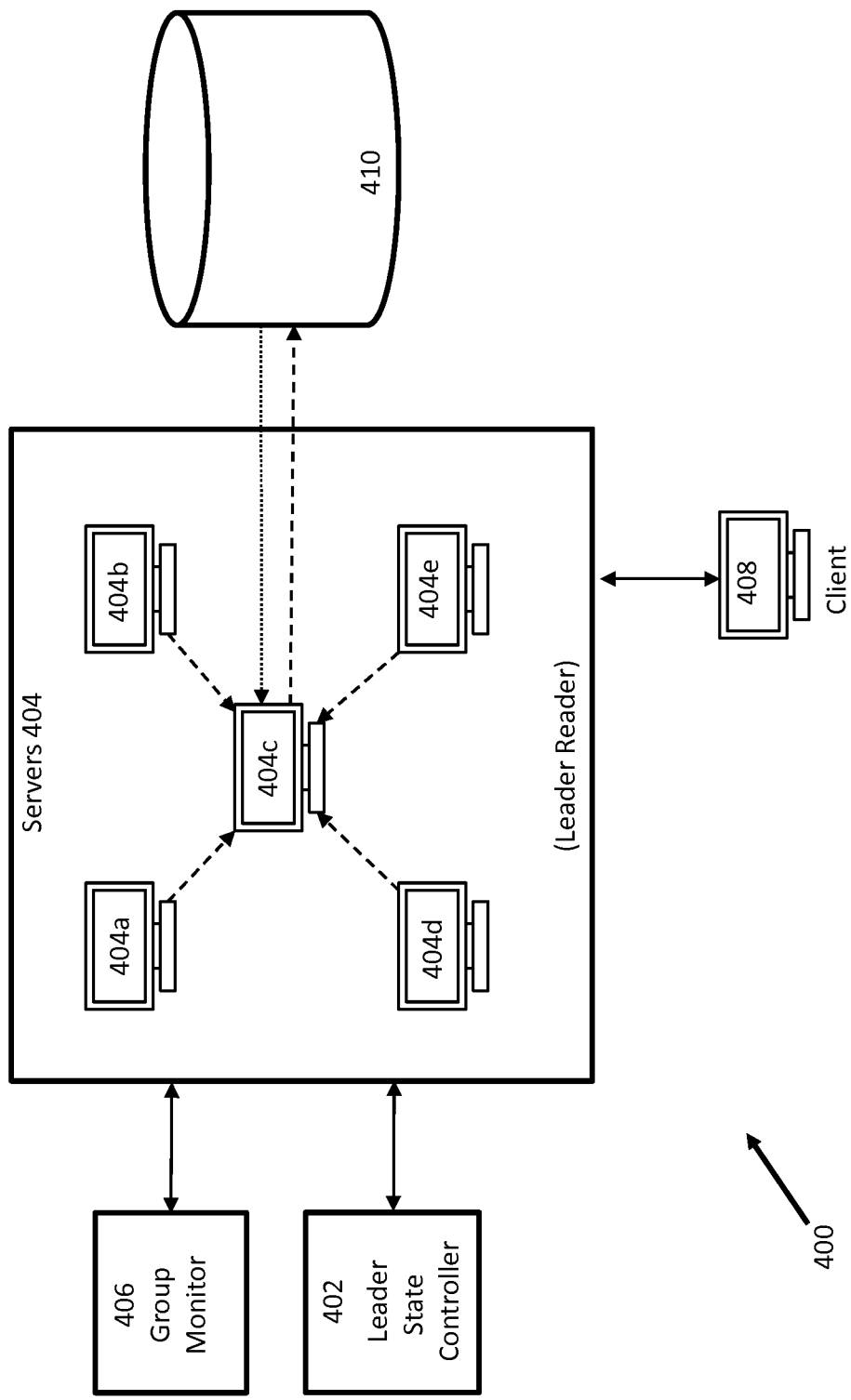
FIG. 4A illustrates an example block diagram of a distributed system in the leader-only state according to some embodiments of the invention.

FIG. 4A illustrates an example system 400 that may be used to implement pulsed leader consensus management. There, the group of nodes is shown as a plurality of servers 404 that may receive requests from client devices 408 to perform read/write operations to one or more data storage devices 410. Though in this example five node/servers are illustrated, one of ordinary skill in the art will appreciate that two or more node/servers may be implemented in the same way. Additionally, in some embodiments, the client 408 is an entity external to the group of nodes 404a-e, as illustrated. However, in some embodiments, one of the nodes (404a-e) may act as the client 408 and request service (e.g. read/writes) from the other nodes in the group. Still yet in some embodiments, client 408 is a collective external entity, such as another group of nodes. One of ordinary skill in the art appreciates that a node (e.g. 404a) may a computing entity, such as a host, client, server, or virtual machine (VM), or other computing node entities as are known in the art.

In some embodiments, a leader state controller 402 may interface with the group of nodes to implement the state logic as illustrated in FIG. 3. While the leader state controller 402 is illustrated as an entity external to the group of nodes 404, one of ordinary skill in the art appreciates that the leader state controller may be integrated into one of the nodes (e.g. 404a), or distributed across all of the nodes (e.g. 404a-e) as a collective protocol or administration module. In some embodiments, the node that is elected as the leader node implements the state logic of FIG. 3. Still yet in other embodiments, a non-leader node may act as a group controller, to implement the state logic but not act as the leader node and not perform leader-only writes.

Further, as according to some embodiments, a group monitor 406 may be implemented to monitor the group of nodes 404 to detect any changes in the group, such as a node addition, removal, and/or failure. Though not depicted, the group monitor 406 may directly interface with the leader state controller 402 to deliver a health pulse, or may deliver the health pulse to the nodes themselves to convey to the leader state controller 402. Again, while in FIG. 4A the modules 406 and 402 are illustrated as external entities, in some embodiments the module functions may be integrated and/or may be distributed across the nodes (e.g. 404a-e). For instance, in an example distributed approach, if the leader node fails, one or more of the non-leader nodes may determine that the leader has terminated and/or that the leader heartbeat has not been detected. When one or more of the nodes determines that the leader has failed, the group of nodes may fall back to read/write operations based at least in part on consensus-based schemes. In contrast, in some embodiments the administrative activities, such as group monitoring state controls, are built into external modules (e.g. 402, 406) that control the behavior of the group of nodes. For example, in that approach, the leader node 404c generates a heartbeat over a first time interval. The group monitor 406 may monitor the heartbeat, such that when the heartbeat is not detected within a second time interval, the group monitor signals the leader state controller 402 to switch the group of nodes 404 back to consensus based reads.

Referring to FIG. 4A, as explained the nodes may each have an index number assigned and, as illustrated, a leader node 404c has been elected using a method such as highest/lowest index election. Though the index method is one approach for selecting a leader, one of ordinary skill in the art appreciates that other selection processes can equally be implemented.

After 404c is elected as the leader node, the non-leader nodes of the group (404a, 404b, 404d, and 404e) may then agree to route all write requests to the leader node 404c, which may then write to one or more data storage devices 410 (where write requests are denoted by dashed lines). Further, as explained above, if the leader receives a read request from the client device 408, the leader node 404c may check with the group monitor 406 whether the group is in sync (assuming the leader node is responsive, active, and/or functioning). In other embodiments, the group monitor, not the leader node (which may be potentially stalled), checks whether the group is in sync before reads are directed to leader node 404c. Still yet in other embodiments, one or more of the nodes may function as the group monitor, such that when the leader fails, the one or more monitor nodes detects the failure and the group falls back to consensus based schemes. In some embodiments, the one or more monitor nodes may directly monitor the leader node, while in other embodiments the monitor nodes monitor the leader node through indirect means, such as gossip protocol.

Figure 4B:
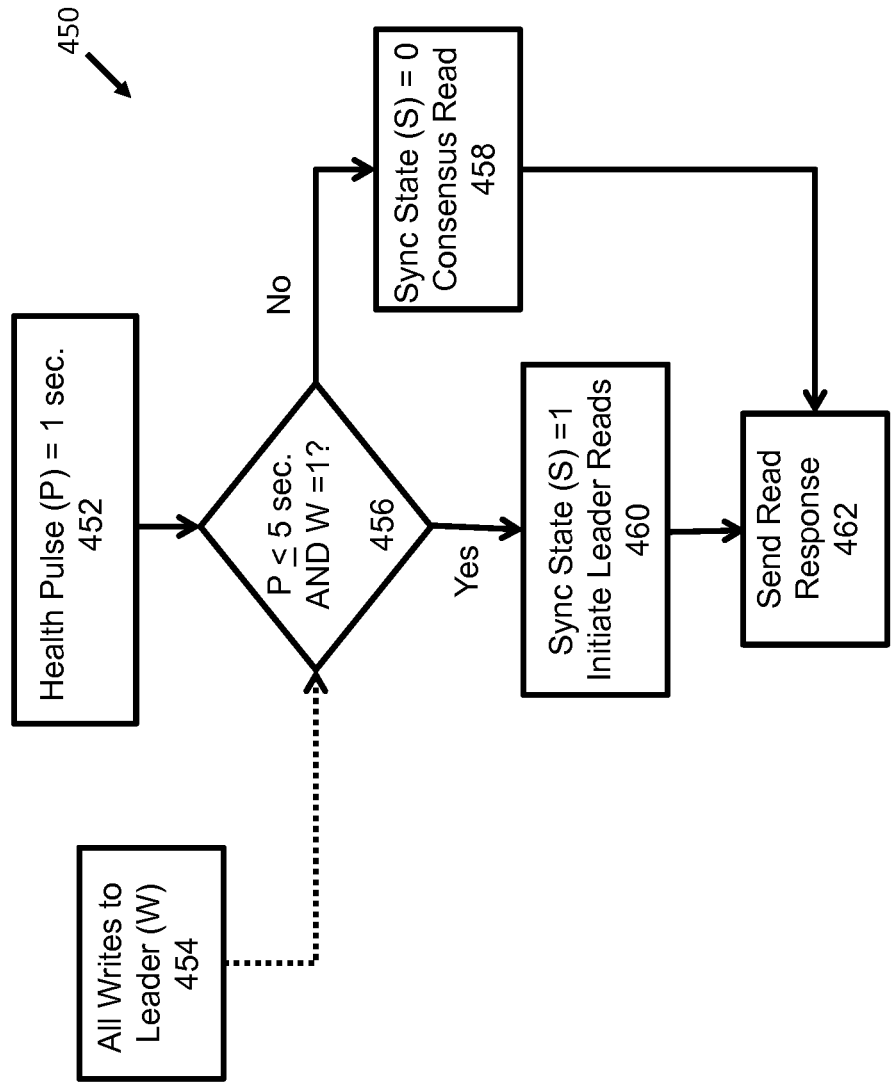
FIG. 4B shows a flowchart of an approach for implementing pulsed leader consensus management using a first and second time interval for a sync state according to some embodiments of the invention.

FIG. 4B shows a process 450 for how health pulse intervals may be implemented, as according to some embodiments. At 452, the leader node generates a heartbeat (e.g. health pulse) over a first time interval such as every one-second. At 456, there is a determination of whether the last health pulse occurred within a second time interval, such as within the last five seconds. As explained this determination could be made by the external modules or by the nodes in the group. Further, though the focus of FIG. 4B is the time intervals, in some embodiments the determination at 456 requires information on whether all writes are currently being routed to the leader node 404c. Continuing, assuming the leader node 404c generates a heartbeat every one second, the monitor modules may constantly check whether the leader node heartbeat occurred within a second time interval (e.g. five seconds).

If the last health pulse occurred within the last five seconds and all writes are currently routed to the leader node (e.g. W=1), then the sync state is not expired (e.g. S=1) and the leader node may safely perform leader-only reads and send read responses at 462. However, if the last health pulse did not occur within the last five seconds, perhaps due to leader node 404c failure, then the sync state is expired (e.g. S=0) and consensus algorithms may be used to perform reads at 458 and return the results at 462.

Figure 4C:
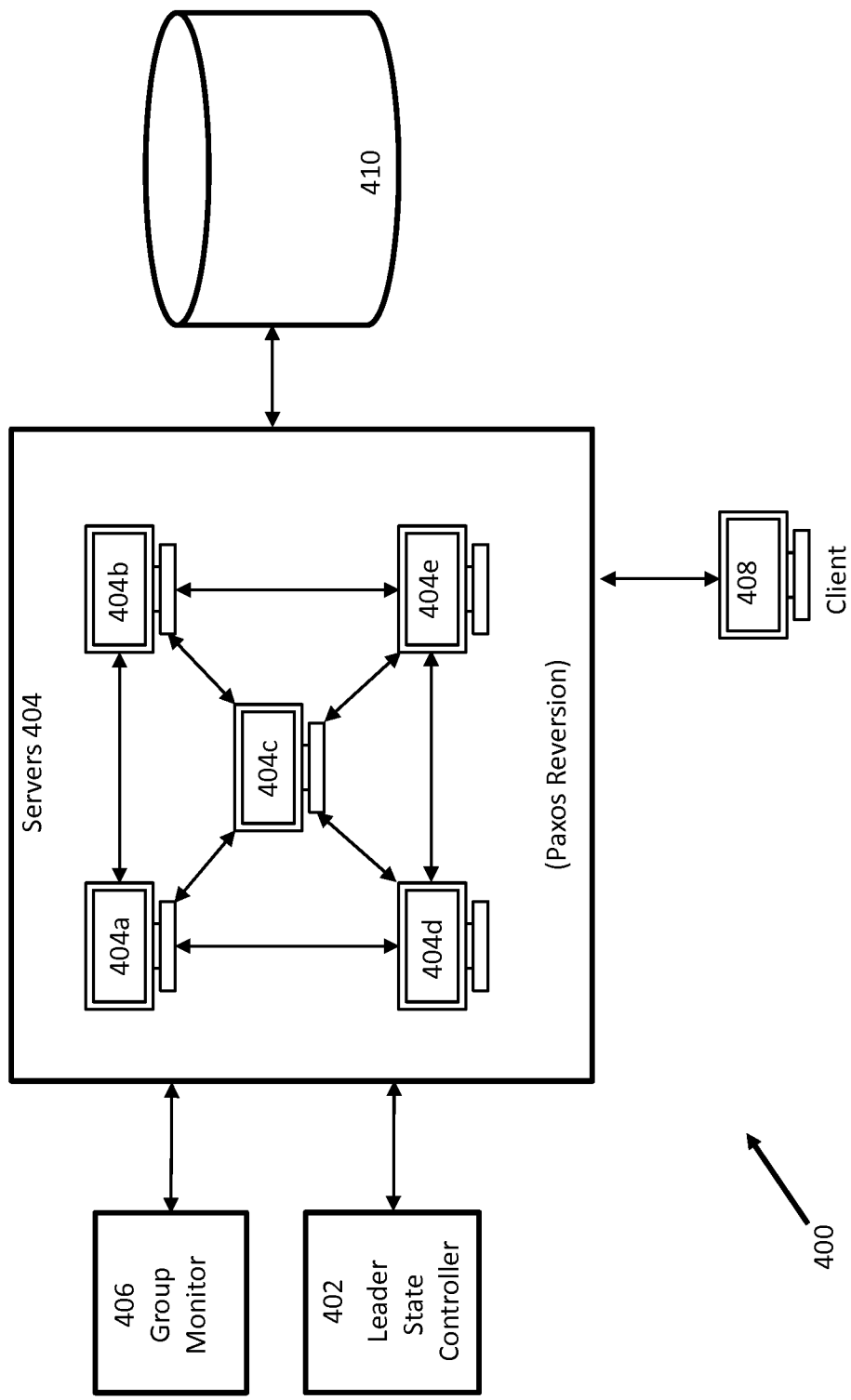
FIG. 4C illustrates an example block diagram implementing pulsed leader consensus management using consensus schemes for an out of sync distributed system according to some embodiments of the invention.

FIG. 4C illustrates one example of how the system 400 may handle an expired sync state, as according to some embodiments. There, when the sync state expires due to leader node failure, the group of nodes 404c revert to consensus reads and writes (which are illustrated by solid double arrows that go from each node to the next). One of ordinary skill in the art can appreciate that by comparing FIG. 4A and FIG. 4C the amount of traffic or overhead is greatly reduced when leader-only reads are implemented. Instead of the group of nodes 404 generating large amounts of traffic (denoted by the numerous double headed arrows) to constantly perform consensus reads that are computationally expensive, using leader-only reads enable a great reduction in overhead by allowing one node to act as the leader and perform leader-only reads so long as the system's sync state is not expired.

Figure 5:
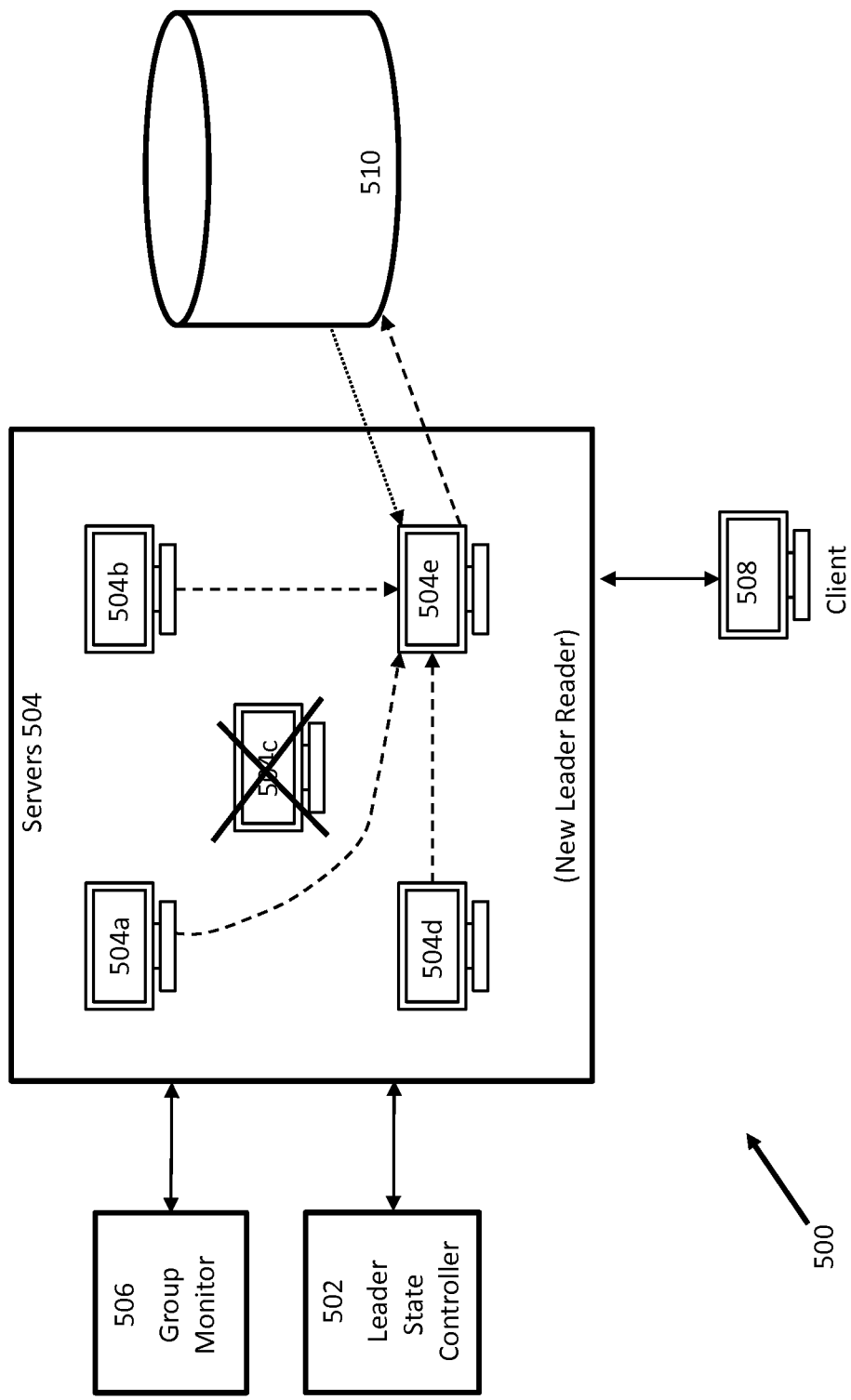
FIG. 5 illustrates an example block diagram implementing pulsed leader consensus management in a distributed system showing a node failure according to some embodiments of the invention.

FIG. 5 illustrates an approach for how a system 500 may handle a node removal and/or failure, as according to some embodiments. There, the previously elected node 504c has failed, and its heartbeat is not detected within the second time interval. Thus, as explained above, the group may revert to consensus based reads.

After the system has reverted to consensus algorithms to perform reads and/or writes (see FIG. 4B) for safety, the group monitor may rescan the group of nodes, and then a new node such as 504e may be elected to act as the new leader node that will receive all writes and perform all reads. In other embodiments, the node with the index number second highest (where the failed node originally had the highest index number) automatically becomes the elected leader.

In some embodiments, elections may be performed by each node trying to become the leader. In the process of trying to assert leadership, the node may learn of another node with a higher index number; in which case the first node lets the node with the higher index number act as leader. That is, if a given node determines that another node has a higher index number, it cedes leadership. But if a given node determines that no other node has an index that is higher than the one it is assigned, that node becomes the leader.

If a new node (not depicted) is added to the group of nodes 504, the health pulse may yield zero (e.g. P=0), thus forcing the system 500 back to consensus reads until the group of nodes can be rescanned, and a new leader node reelected. The above illustrations merely serve as examples for how some embodiments of leader pulsed consensus management may be implemented. For example, the state logic may be delegated to the leader state controller 502 which may then control leader elections and enforce the state logic as illustrated in FIG. 3.

Figure 6:
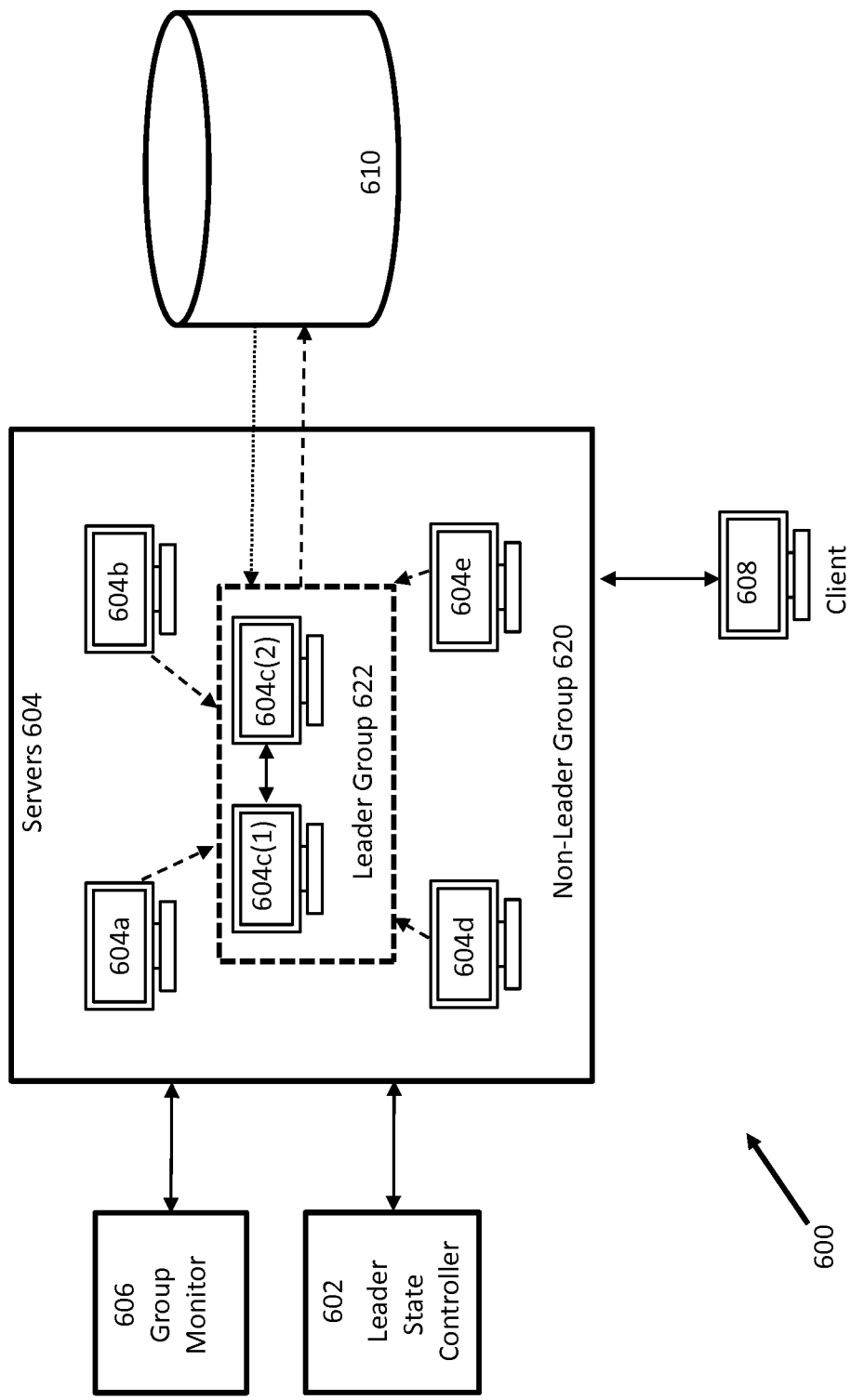
FIG. 6 illustrates an example block diagram implementing pulsed leader consensus management in a distributed system showing two leader nodes according to some embodiments of the invention.

FIG. 6 illustrates an example architecture using two leader nodes to cooperatively read and/or write data, as according to some embodiments. There, two or more leader nodes, such as 604c(1) and 604c(2), act as replicas of one another. For example, if leader node 604c(1) fails, a still active leader node, such as 604c(2) can replace the failed leader node and serve reads and perform writes in its place. In some embodiments, the two or more leader nodes may update one another with backups of group state information. In this way, if the active leader node fails, a second leader node may replace it using the backup information.

In some embodiments, the two or more leader nodes may implement an arbitration or consensus scheme (e.g. Paxos) amongst themselves to ensure data consistency. For example, while the nodes in the non-leader group 620 (e.g. 604a, 604b, 604d, and 604e) may use the pulsed leader approaches described above to avoid consensus based reads and writes, the nodes in the leader group 622 may still implement reads based at least in part on consensus schemes to perform reads and writes. In this way, the non-leader nodes may see (e.g. identify) the leader node group as a single leader entity that they are sending writes to and/or requesting reads.

In some embodiments, different sets of non-leader nodes may be assigned to route all the write requests to different specified leader nodes. For example, leader node 604c(1) may be assigned a first sub-set of non-leader nodes, including 604a and 604d; while 604c(2) may be assigned a second sub-set of non-leader nodes, including 604b and 604e. As non-leader nodes, 604a-e simply forward their write requests to their respective (e.g. assigned) leader nodes.

In some embodiments, the leader nodes may forward all writes to a designated leader node to perform the writes. In some embodiments, the leader nodes may arbitrate writing data values in situations where inconsistent data writes are received. After the data is written, a client (e.g. 604d, 608) may request a specific data item read. To read, the leader nodes may perform a consensus based read operation.

This hybrid configuration (i.e. using pulsed leader schemes for non-leader nodes and consensus based schemes for the leader nodes) still results in an increase in efficiency because the number of nodes that participated in the often-slow consensus/arbitration process is reduced.

In some embodiments, leader-node queues may be implemented for reads or writes for the leader node group 622. That is, a read operation originating from 604d, for instance, may be added to a queue. The leader node group 622 may process the queue as a group, parsing through read and write requests one after the other.

Regarding election, in some embodiments, a range of nodes with the highest index numbers may be elected as leaders. For example, if there are ten nodes and thus ten index numbers (e.g. z1, z2, z3 . . . z10), then the nodes that correspond to the top three index numbers (e.g. z10, z9, z8)

may be elected leaders and act as replicas or may process reads/writes using consensus based schemes. Yet in some embodiments, a node may be designated as back up replicas of a single elected reader node. Using the example above, the node that corresponds to z10 may be elected the leader, and after election two pre-designated nodes (internal or external to the group) may be assigned the task of acting as leader replicas.

Figure 7:
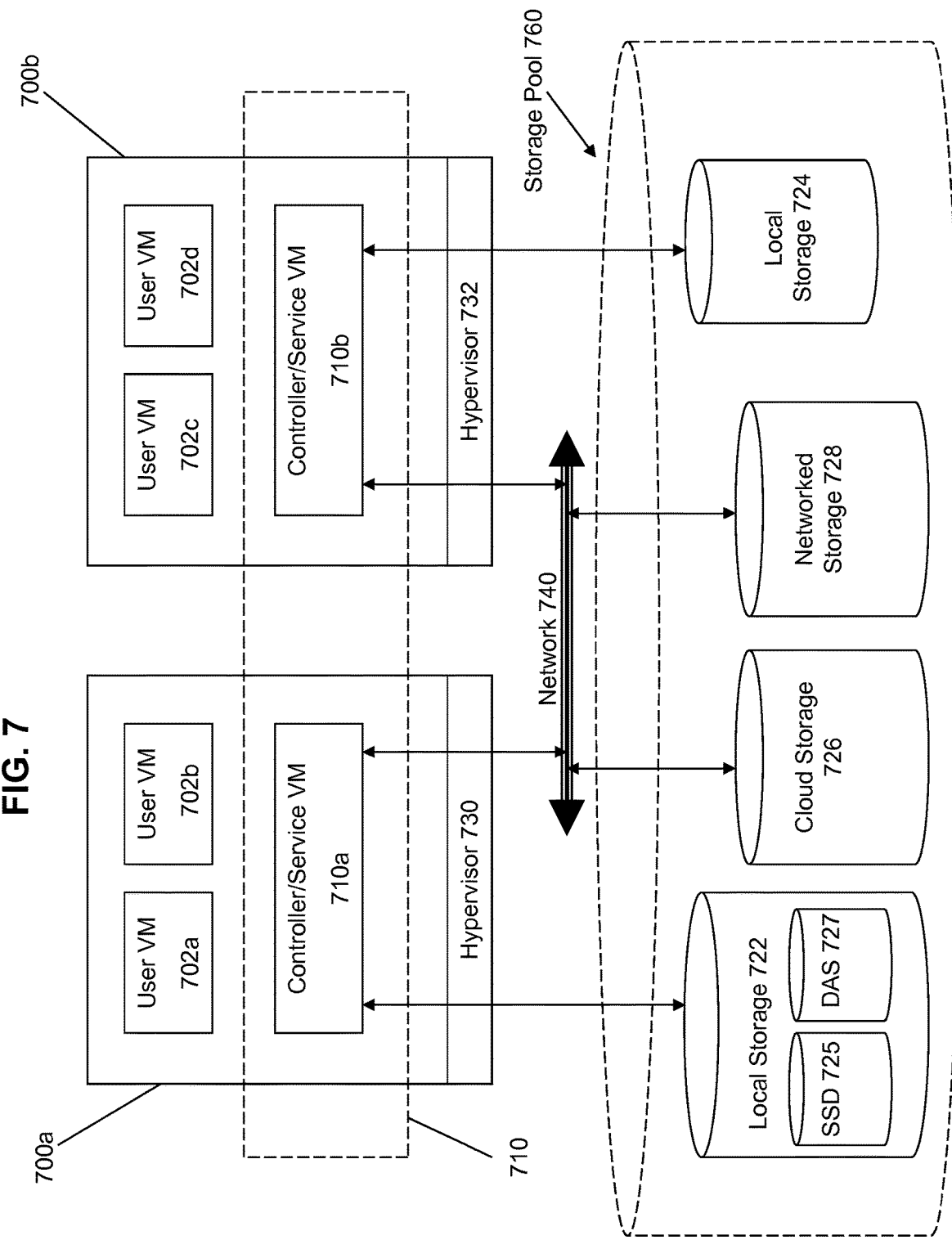
FIG. 7 illustrates an example architecture to implement pulsed leader consensus management in a virtualization environment according to some embodiments of the invention.

The leader pulsed consensus management systems and methods described above may be implemented and work well in various configurations. FIG. 7 illustrates an exemplarily architecture for implementing leader pulsed consensus management in a virtualization environment according to some embodiments of the invention. The architecture of FIG. 7 can be implemented for a distributed platform that contains multiple servers 700a and 700b that manages multiple-tiers of storage. Like the prior art, the multiple tiers of storage includes storage that is accessible through a network 740, such as cloud storage 726 or networked storage 728 (e.g., a SAN or "storage area network"). Unlike the prior art, the present embodiment also permits management of local storage 722/724 that is within or directly attached to the server and/or appliance. Examples of such storage include SSDs 725 ("Solid State Drives") or HDDs ("hard disk drives") 727. These collected storage devices, both local and networked, form a storage pool 760. Virtual disks (or "vDisks") can be structured from the storage devices in the storage pool 760, as described in more detail below. As used herein, the term vDisk refers to the storage abstraction that is exposed by a Service VM to be used by a user VM. In some embodiments, the vDisk is exposed via iSCSI ("internet small computer system interface") or NFS ("network file system") and is mounted as a virtual disk on the user VM.

Each server 700a or 700b runs virtualization software, such as the ESX product available from VMWare. The virtualization software includes a hypervisor 730/732 to manage the interactions between the underlying hardware and the one or more user VMs 702a, 702b, 702c, and 702d that run client software.

A special VM 710a/710b is used to manage storage and I/O activities according to some embodiment of the invention, which is referred to herein as a "Service VM". The Service VMs 710a/710b are not formed as part of specific implementations of hypervisors 730/732. Instead, the Service VMs run as virtual machines in the hypervisors 730/732 on the various servers 702a and 702b, and work together to form a distributed system 710 that manages all the storage resources, including the locally attached storage 722/724, the networked storage 728, and the cloud storage 726. Since the Service VMs run above the hypervisors 730/732, this means that the current approach can be used and implemented within any virtual machine architecture, since the Service VMs of embodiments of the invention can be used in conjunction with any hypervisor from any virtualization vendor.

Each Service VM 710a-b exports one or more block devices or NFS server targets that appear as disks to the client VMs 702a-d. These disks are virtual, since they are implemented by the software running inside the Service VMs 710a-b. Thus, to the user VMs 702a-d, the Service VMs 710a-b appear to be exporting a clustered storage appliance that contains some disks. All user data (including the operating system) in the client VMs 702a-d resides on these virtual disks.

Significant performance advantages can be gained by allowing the virtualization system to access and utilize local (server-internal) storage 722 as disclosed herein. This is because I/O performance is typically much faster when performing access to local storage 722 as compared to performing access to networked storage 728 across a network 740. This faster performance for locally attached storage 722 can be increased even further by using certain types of optimized local storage devices, such as SSDs 725.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 722. On the other hand, data that does not require fast access or which is accessed infrequently can be stored in the networked storage devices 728 or in cloud storage 726.

Yet another advantage of the present embodiment of the invention is that storage-related optimizations for access and storage of data can be implemented directly within the primary storage path. For example, in some embodiments of the invention, the Service VM 710a can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Service VMs include quality of service (QoS) functions, encryption, and compression. The new architecture massively parallelizes storage, by placing a storage controller—in the form of a Service VM—at each hypervisor, and thus makes it possible to render enough CPU and memory resources to achieve the aforementioned optimizations.

System Architecture

Figure 8:
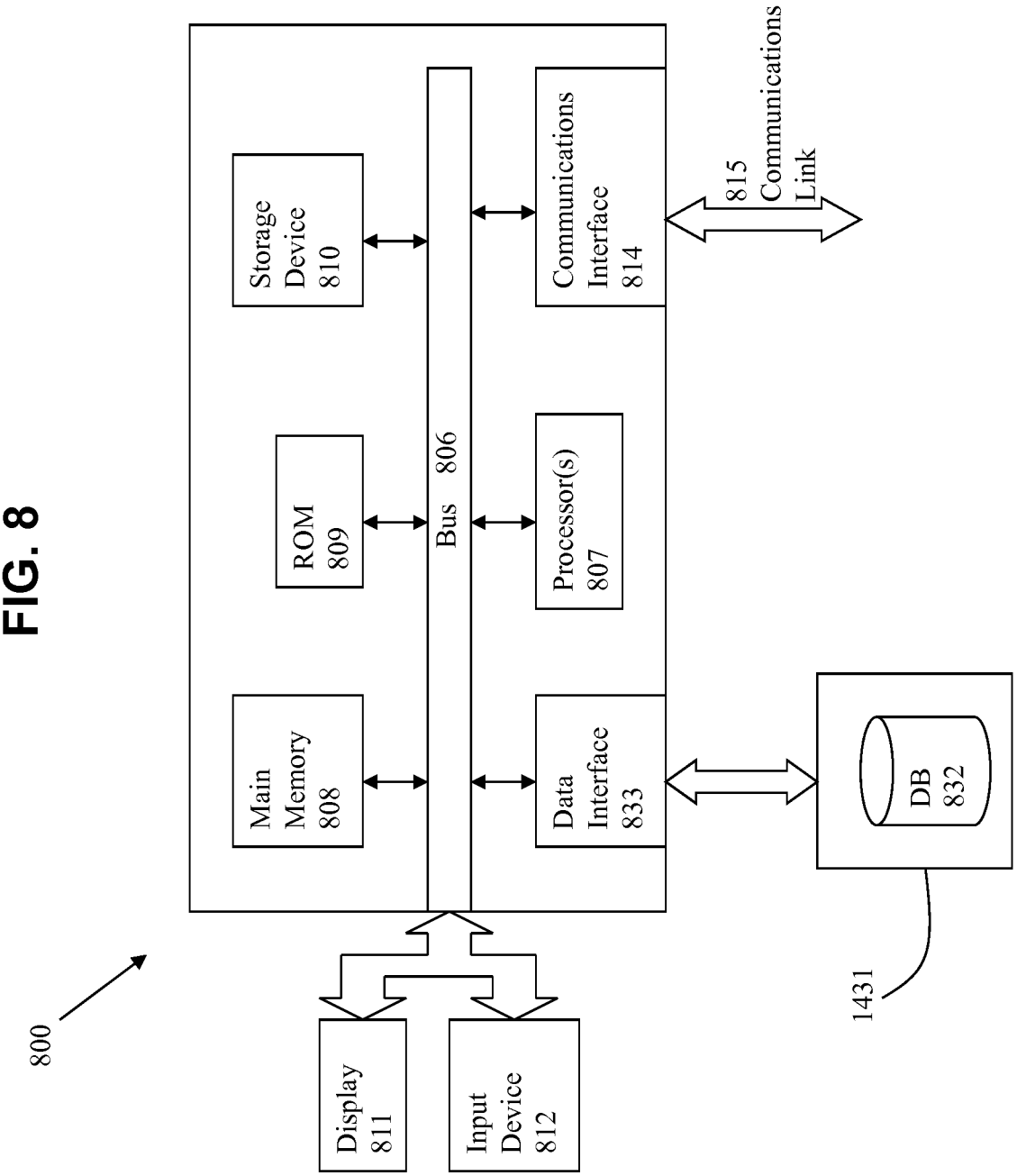
FIG. 8 is a block diagram of a computing system suitable for implementing an embodiment of the present invention.

FIG. 8 is a block diagram of an illustrative computing system 800 suitable for implementing an embodiment of the present invention. Computer system 800 includes a bus 806 or other communication mechanism for communicating information, which interconnects subsystems and devices, such as processor 807, system memory 808 (e.g., RAM), static storage device 809 (e.g., ROM), disk drive 810 (e.g., magnetic or optical), communication interface 814 (e.g., modem or Ethernet card), display 811 (e.g., CRT or LCD), input device 812 (e.g., keyboard), and cursor control.

According to one embodiment of the invention, computer system 800 performs specific operations by processor 807 executing one or more sequences of one or more instructions contained in system memory 808. Such instructions may be read into system memory 808 from another computer readable/usable medium, such as static storage device 809 or disk drive 810. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 807 for execution. Such a medium may take many forms, including but not limited to, non-volatile media and volatile media.

Non-volatile media includes, for example, optical or magnetic disks, such as disk drive 810. Volatile media includes dynamic memory, such as system memory 808.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 800. According to other embodiments of the invention, two or more computer systems 800 coupled by communication link 815 (e.g., LAN, PTSN, or wireless network) may perform the sequence of instructions required to practice the invention in coordination with one another.

Computer system 800 may transmit and receive messages, data, and instructions, including program, i.e., application code, through communication link 815 and communication interface 814. Received program code may be executed by processor 807 as it is received, and/or stored in disk drive 810, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for managing storage, the method comprising:
    receiving a read request for data managed by a group of two or more nodes at a node of the group of two or more nodes, wherein a leader node is elected from the group of two or more nodes;
    determining that a sync state of the leader node is expired, the sync state corresponding to the read request and to the group of two or more nodes, wherein the sync state is expired at least because the leader node has failed or is unresponsive; and
    reading from two or more storage devices using a plurality of nodes in response to the read request while the leader node has failed or is unresponsive, the node implementing a consensus scheme before a new leader node is elected to identify data to transmit to one or more users associated with the read request.

2. The method of claim 1, further comprising:
    receiving a second read request at a second node of the group of two or more nodes for data managed by the group of two or more nodes;
    determining that a second sync state of the new leader node is not expired, the second sync state corresponding to the second read request and to the group of two of more nodes; and
    reading from one or more storage devices using only the new leader node in response to the second read request while the second sync state is not expired.

3. The method of claim 1, wherein consensus scheme reads are Paxos-based read operations.

4. The method of claim 1, wherein the sync state is expired if a health pulse that corresponds to the group of two or more nodes is not detected.

5. The method of claim 4, wherein the sync state is expired if write requests managed by the group of two or more nodes are not routed to the leader node.

6. The method of claim 4, wherein the health pulse corresponds to the leader node such that if the leader node fails the health pulse will not be detected.

7. The method of claim 4, wherein the health pulse is generated on a first time interval.

8. The method of claim 7, wherein the sync state is expired when the health pulse is not detected within a second time interval.

9. The method of claim 1, wherein the group of two or more nodes are informed of the leader node and agree to send all write requests to the leader node.

10. The method of claim 2, further comprising electing a new leader node when the sync state is expired.

11. The method of claim 10, wherein electing a new leader node comprises:
    electing a node of the group of two or more nodes as the new leader node based on at least one or more parameters;
    entering a transitional state at the new leader node;
    scanning the group of two or more nodes to identify data being written to nodes of the group of two or more nodes;
    aggregating the data being written at the nodes of the group of two or more nodes at the leader node; and
    notifying the nodes of the group of two or more nodes of a status and identity of the new leader node to exit the transitional state.

12. A computer program product embodied on a non-transitory computer readable medium, the computer readable medium having stored thereon a sequence of instructions which, when executed by a processor causes the processor to execute a process for implementing a method for storage management, the process comprising:
    receiving a read request for data managed by a group of two or more nodes at a node of the group of two or more nodes, wherein a leader node is elected from the group of two or more nodes;
    determining that a sync state of the leader node is expired, the sync state corresponding to the read request and to the group of two or more nodes, wherein the sync state is expired at least because the leader node has failed or is unresponsive; and
    reading from two or more storage devices using a plurality of nodes in response to the read request while the leader node has failed or is unresponsive, the node implementing a consensus scheme before a new leader node is elected to identify data to transmit to one or more users associated with the read request.

13. The computer program product of claim 12, the process further comprising:
    receiving a second read request at a second node of the group of two or more nodes for data managed by the group of two or more nodes;
    determining that a second sync state of the new leader node is not expired, the second sync state corresponding to the second read request and to the group of two of more nodes; and
    reading from one or more storage devices using only the new leader node in response to the second read request while the second sync state is not expired.

14. The computer program product of claim 12, wherein the sync state is expired if a health pulse that corresponds to the group of two or more nodes is not detected.

15. The computer program product of claim 14, wherein the sync state is expired if write requests managed by the group of two or more nodes are not routed to the leader node.

16. A system for managing storage with a processor, the processor performing actions when executing instructions of a set of instructions stored in a memory, the actions comprising:
receiving a read request for data managed by a group of two or more nodes at a node of the group of two or more nodes, wherein a leader node is elected from the group of two or more nodes;
determining that a sync state of the leader node is expired, the sync state corresponding to the read request and to the group of two or more nodes, wherein the sync state is expired at least because the leader node has failed or is unresponsive; and
reading from two or more storage devices using a plurality of nodes in response to the read request while the leader node has failed or is unresponsive, the node implementing a consensus scheme before a new leader node is elected to identify data to transmit to one or more users associated with the read request.

17. The system of claim 16, the actions further comprising:
receiving a second read request at a second node of the group of two or more nodes for data managed by the group of two or more nodes;
determining that a second sync state of the new leader node is not expired, the second sync state corresponding to the second read request and to the group of two of more nodes; and
reading from one or more storage devices using only the new leader node in response to the second read request while the second sync state is not expired.

18. The system of claim 16, wherein the sync state is expired if a health pulse that corresponds to the group of two or more nodes is not detected.

19. The system of claim 18, wherein the sync state is expired if write requests managed by the group of two or more nodes are not routed to the leader node.

20. The system of claim 18, wherein the health pulse corresponds to the leader node such that if the leader node fails the health pulse will not be detected.

* * * * *